United States Patent Office 3,460,349
Patented Aug. 12, 1969

3,460,349
REACTION ENGINE WITH INTERMITTENT THRUST AND DIRECTION CONTROL
Richard E. Biehl, Pearl River, N.Y., assignor to Curtiss-Wright Corporation, a corporation of Delaware
Filed Apr. 7, 1967, Ser. No. 629,298
Int. Cl. F02k 1/24, 9/04
U.S. Cl. 60—228                                    7 Claims

ABSTRACT OF THE DISCLOSURE

An intermittent thrust-pulse type of reaction engine comprising an integrated assembly for producing and controlling the direction of thrust pulses. The assembly includes a sprocket mechanism for advancing a belt of individual rocket motors and serially positioning the motors with regard to a discharge nozzle, drive means for the sprocket mechanism, circuit means for firing the rocket motors individually or serially in bursts, and means for angularly orienting the assembly to provide a selected direction of thrust.

---

This invention concerns reaction engines for producing discrete, standard thrust pulses, either singly or in a train or burst according to control thrust command, and has for its principal object an improved reaction engine of the intermittent thrust-pulse type, wherein the thrust vector can be varied as to direction within material limits coincident with production of successive thrust pulses within the normal sequence order of engine operation.

Reaction engines of the intermittent thrust-pulse type are useful for space vehicle control, such as for varying its velocity in space and/or its orientation of axes, according to the direction and number of applied thrust pulses. Such engines can also be used for orienting accessories of the vehicle, including cameras, antennas, etc. One example of this type of reaction engine is shown in application Ser. No. 438,943 filed Mar. 11, 1965, now Patent No. 3,316,719, by Joseph F. Loprete for "Intermittent Thrust Device" and owned by the assignee of the present invention. The Loprete engine has a rotary device that is operable in steps for advancing "one-shot" or expendible thrust motors to respective firing positions. These positions are selected according to the command thrust direction, generally involving the resultant of two thrust vectors. The rotary device is housed by a circular casing that has a plurality of relatively fixed nozzles spaced around its periphery, and a thrust motor is positioned for firing opposite each nozzle in radial alignment with the exhaust axis thereof. When a thrust motor (or motors) is fired on command, it produces a pulse type jet of combustion gases that is radially directed from a selected nozzle (or nozzles), depending on the command direction of thrust; that is, assuming the desired direction of thrust coincides with the radial position of a given nozzle, firing at that nozzle is sufficient; however, if the command direction lies between the radial positions of two nozzles, firing at both is required in amount to produce a resultant thrust vector having the command direction. Thus, for automatic control a sophisticated and expensive system is required for precise direction vectoring, i.e., for coordinating engine firing with the peripheral location of the appropriate direction nozzles.

In accordance with the present invention, the thrust vector can be varied on command by varying the direction of discharge from a single orientable nozzle, while maintaining a normal order of consecutive thrust motor firings. The advantages inherent in this improvement include simplified command firing control, precise determination of the thrust vector, simplification of nozzle structure and optimum use of the expendible thrust motors.

Figure 1:
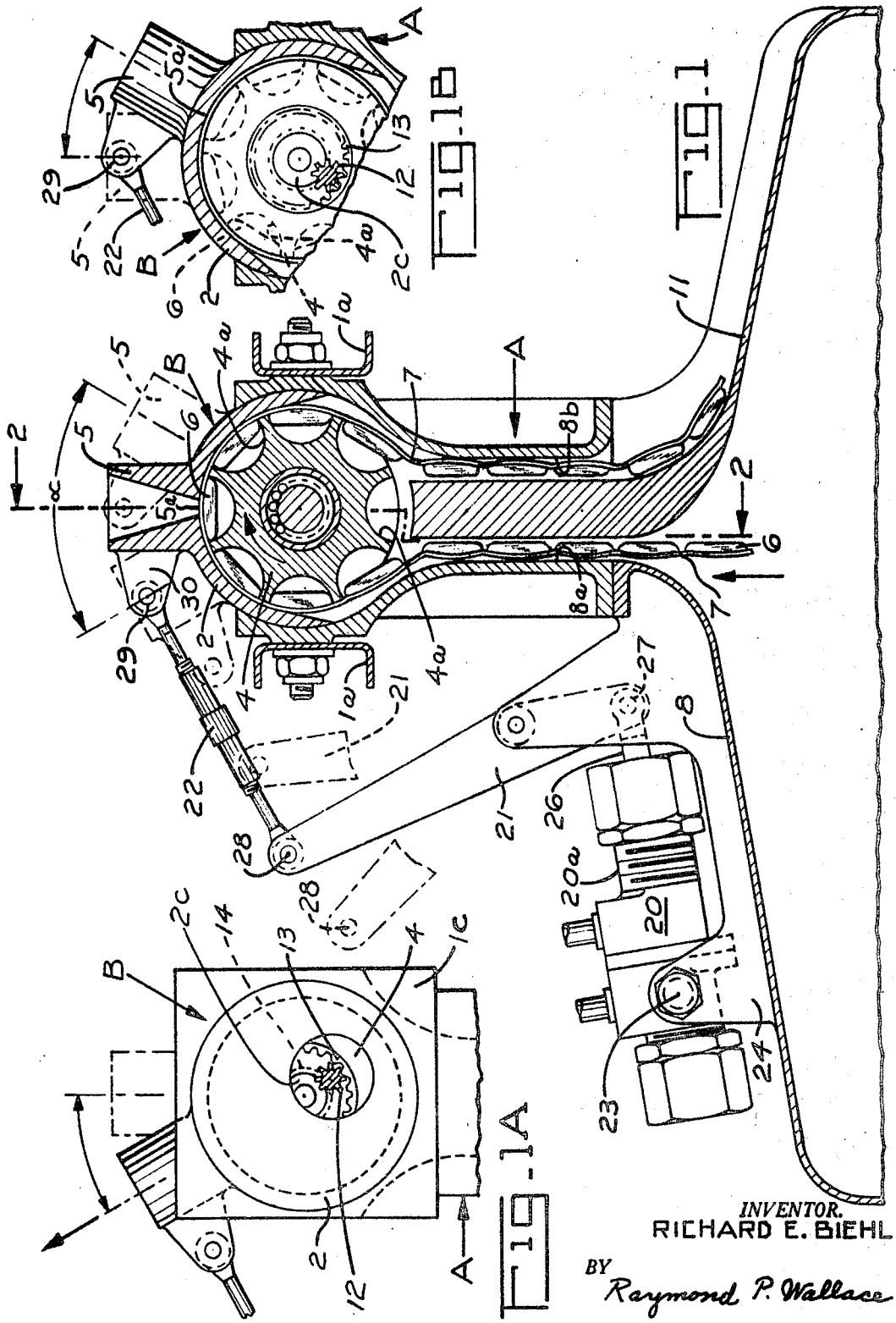

Referring first to the drawings:
FIG. 1 is an elevational view partly in section taken along the line 1—1 of FIG. 2, of an intermittent thrust reaction engine embodying the present invention;
FIGS. 1A and 1B are partial views in section showing the sprocket-wheel drive and the direction nozzle structure of FIG. 1 adjusted for different thrust command directions; and
FIG. 2 is a sectional view taken along the line 2—2 of FIG. 1.

The invention will be more fully set forth in the following description referring to the accompanying drawings, and the features of novelty will be pointed out with particularity in the claims annexed to and forming a part of this specification.

Figure 2:
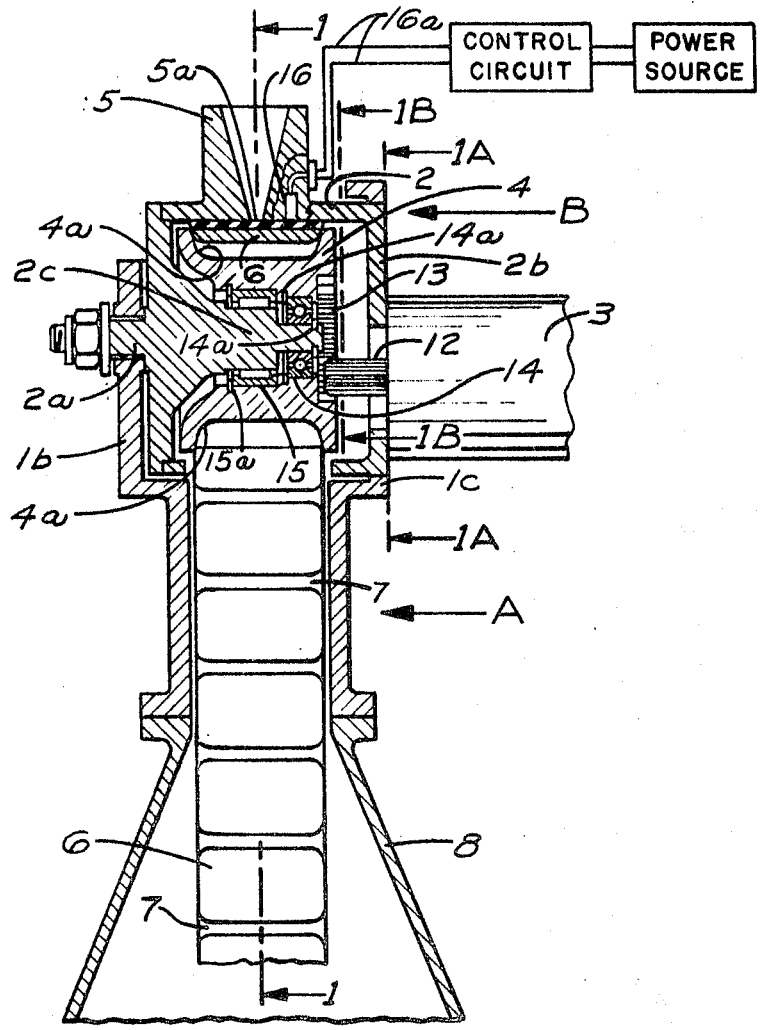

The reaction engine in respect of basic structure, FIGS. 1 and 2, essentially comprises two relatively movable housings, namely, a main supporting base housing A that is rigidly mounted as by brackets 1a on the space vehicle to be controlled, and a complementary housing assembly B that is mounted for angular movement in the base housing A. The assembly B is constructed around a guide housing or casing 2 that is generally semicylindrical in form and rotatably mounted for sleeve-like fit, FIG. 1, in the main housing. The casing 2 (assembly) can be rotated by servo means hereinafter described, to various angular positions, FIGS. 1A and 1B, and has bearing support at one side of a trunnion 2a in the main housing end wall 1b; at the opposite side 2b the casing extends into a circular opening in the main housing end wall 1c that constitutes the bearing.

The guide housing 2 in turn carries at one end wall 2b an electric stepping motor 3, FIG. 2, for driving a sprocket-like wheel 4 that is rotatably mounted on a hub 2c extending inwardly from the trunnion supported side wall. A thrust direction nozzle 5 having a throat 5a closely adjacent the periphery of the wheel 4 is carried by the upper cylindrical wall of the casing 2 and extends radially therefrom. The sprocket-like configuration of the wheel 4 defines equally spaced cavities 4a at its periphery for receiving and sequentially advancing to firing position at the nozzle throat respective thrust motors 6 as presently described.

The drive connection between the stepping motor 3 and the sprocket wheel 4, FIG. 2, comprises in the present instance a pinion gear 12 that is connected to the output shaft of the motor, and a ring gear 13 having teeth at its inner side (internal type) in mesh with the pinion, FIGS. 1 and 2. The ring gear is suitably secured in fixed relation to the sprocket wheel for transmitting thereto positive drive from the stepping motor. The sprocket wheel is mounted on the hub 2c, as by ball and roller bearings 14 and 15 that are seated on different diameter portions of the hub and suitably positioned thereon by retaining rings 14a and 15a, respectively.

For producing intermittent thrust at the nozzle exhaust, a series of expendible thrust motors 6 are arranged to be successively advanced in discrete steps by the stepping motor 3 and sprocket wheel 4 to respective firing positions precisely opposite the nozzle throat 5a. To this end, the thrust motors are carried by a suitable supply medium, such as a tape or belt 7, and conform in width and spacing to the respective wheel cavities 4a for smooth and accurate sprocket pickup.

The thrust motors which are suitably attached or bonded to the tape medium are of capsule form and have an expandable casing containing a solid propellant that is ignited by energizing a firing circuit, all as described in the Loprete application above. It is therefore sufficient here to state that the firing circuit includes a pair of contacts (not shown) that are carried by each capsule and have externally exposed surfaces; these contacts are connected to an igniter, such as a fuse, etc., embedded in the capsule propellant. The capsule contacts in moving to firing position make wiping engagement and align with a pair of corresponding spaced brush-type contacts one of which is indicated at 16, FIG. 2. The contacts 16 are suitably insulated and flush-mounted in the upper wall of the casing 2, all in the manner described in the aforesaid Loprete application. The fixed contacts 16 are in turn connected to leads 16a forming part of the firing control circuitry, shown schematically in FIG. 2.

In a practical arrangement for ensuring accuracy and continuity of supply feed for firing sequence, the capsule-carrying belt 7 is advanced by the sprocket wheel as indicated by the direction arrow from a suitable storage bin or container indicated at 8, the tape and attached capsules (live and spent) being guided for positive linear movement from and to the storage bin through vertical passages 8a and 8b respectively, in the main support housing A. These passages are defined by the opposite side walls respectively, of the housing and a central dividing element 8c positioned between the entering and discharging bights of tape 7. The divider 8c may be made as part of the housing, or may be a projecting part extending from the magazine, as shown. It may also be provided with a guide surface 11 directing ejected capsules to a collection bin. The provision of such a separating element between incoming and outgoing capsules insures that discharged tape will not follow the sprocket wheel around, or foul the bight of incoming tape.

Referring especially to FIG. 2 the nozzle-housing assembly B including the stepping motor and sprocket wheel, constitutes an integrated unit that is bodily movable without affecting the inter-relationship of the assembly components; that is, rotation of this assembly through an angle relative to the main support housing in response to a command for change in thrust direction, does not affect the relative position of a given point (capsule) on the periphery of the sprocket wheel to the nozzle throat. The normal sequence of capsule feed to the nozzle remains the same. The feed tape 7 therefore can be advanced unidirectionally for firing all the capsules in orderly sequence (as required), thereby avoiding ejection of live capsules.

Summarizing, firing of the capsules without disturbing the sequence of supply is, in the present invention, compatible with concurrent variation in direction of the thrust-vector in large or fine degree within the limits of nozzle movement, FIGS. 1A and 1B.

The thrust direction control for rotating the assembly B and varying the angular position of the nozzle 5 can assume various forms, one of which may comprise a servo motor device 20 that is operatively connected through a crank 21 and link 22, adjustable in length, to the nozzle. In the specific example shown, the servo 20 comprises a hydraulic cylinder and piston that is operated from a suitable pressure source (not shown). The cylinder proper 20a of the device is pivotally carried at 23 on a support bracket 24 that also carries at 25 the main crank 21. The cylinder piston (not shown) has an operating rod 26 that is connected at 27 to the lower arm of the crank 21; the other end of the crank is pivotally connected at 28 to the adjustable link 22 that in turn is connected at 29 to a lug 30 formed on the nozzle. Accordingly, it will be seen that application of hydraulic pressure in conventional manner to the servo 20 is effective to rotate the crank 21 for varying in required amount and sense the angular position of the nozzle 5 throughout an arc such as indicated at α.

It should be understood that this invention is not limited to specific details of construction and arrangement thereof herein illustrated, and that changes and modifications may occur to one skilled in the art without departing from the spirit of the invention.

What is claimed is:

1. A reaction engine of the intermittent thrust type having a feed device that is movable in discrete steps according to command control of a drive motor therefor, and a plurality of expendible thrust motors of capsule form arranged to be sequentially moved by said feed device to a discharge nozzle that determines the direction of the reaction thrust pulse incident to motor firing, characterized by movable support structure for the discharge nozzle, the stepper drive motor and the feed device being in direct drive relation and bodily carried by the support structure for progressive advance of the thrust capsule motors, one at a time, to the nozzle for command control firing whereby the support structure, discharge nozzle, feed device and drive motor constitute an integrated assembly unit, a relatively fixed base on which the assembly unit is mounted for angular movement, and means independent of the drive connection between the stepping motor and feed device for rotating the assembly unit and thereby selectively adjusting the nozzle discharge angle.

2. A reaction engine, as specified claim 1, wherein the movable support structure and the fixed base have complementary, concentric portions respectively, and the fixed base portion constitutes bearing means in which the movable portion is mounted for limited rotation for varying the angular position of the assembly unit.

3. A reaction engine, as specified in claim 1, wherein a servo motor controlled according to thrust direction command is operatively connected to the rotatable assembly unit for varying the nozzle discharge direction.

4. A reaction engine, as specified in claim 2, wherein the movable concentric portion has rigidly mounted thereon a nozzle extending radially with respect to the axis of rotation of the assembly unit.

5. A reaction engine, as specified in claim 4, wherein the feed device constitutes a sprocket wheel for pick-up and advance of a tape carrying the thrust motors, the wheel being mounted for rotation within the movable concentric portion for sequential advance of the thrust motors to the throat of the nozzle for command firing, the respective axes of rotation of the wheel, drive motor and assembly unit bearing fixed relations to each other.

6. A reaction engine, as specified in claim 5, wherein the fixed base defines respective passages for the tape carrying the live and spent thrust capsule motors to and from the periphery of the sprocket wheel within the movable concentric support.

7. A reaction engine as recited in claim 6, wherein said passages are separated by a divider positioned between incoming and outgoing bights of tape to prevent the outgoing bight from fouling the incoming bight.

References Cited

UNITED STATES PATENTS

| | | | |
|---|---|---|---|
| 2,993,463 | 7/1961 | McKinney | 60—232 XR |
| 3,263,419 | 8/1966 | Schmitz | 60—250 |
| 3,316,719 | 5/1967 | Loprete | 60—250 XR |
| 3,328,962 | 7/1967 | DeFeo et al. | 60—250 XR |
| 3,328,963 | 7/1967 | Kraus | 60—250 |
| 3,358,454 | 12/1967 | Snyder | 60—250 XR |

CARLTON R. CROYLE, Primary Examiner

U.S. Cl. X.R.

60—250